(12) United States Patent
Liu et al.

(10) Patent No.: US 11,050,111 B2
(45) Date of Patent: Jun. 29, 2021

(54) BATTERY MODULE AND PROTECTING ASSEMBLY THEREOF

(71) Applicant: CONTEMPORARY AMPEREX TECHNOLOGY CO., LIMITED, Ningde (CN)

(72) Inventors: Daohui Liu, Ningde (CN); Chuanlian Chen, Ningde (CN); Hanqing Gao, Ningde (CN); Shengtian Cai, Ningde (CN); Yangzhi Huang, Ningde (CN)

(73) Assignee: CONTEMPORARY AMPEREX TECHNOLOGY CO., LTD., Ningde (CN)

( * ) Notice: Subject to any disclaimer, the term of this patent is extended or adjusted under 35 U.S.C. 154(b) by 79 days.

(21) Appl. No.: 16/518,806

(22) Filed: Jul. 22, 2019

(65) Prior Publication Data
US 2020/0127253 A1   Apr. 23, 2020

(30) Foreign Application Priority Data
Oct. 17, 2018   (CN) .......................... 201821680852.X (51) Int. Cl.
*H01M 50/20*   (2021.01)
*H01M 10/04*   (2006.01)
(Continued)

(52) U.S. Cl.
CPC ........... *H01M 50/20* (2021.01); *H01M 10/04* (2013.01); *H01M 50/147* (2021.01);
(Continued)

(58) Field of Classification Search
CPC ........ H01M 2/1077; H01M 2/04; H01M 2/26; H01M 2/34; H01M 1/04; H01M 50/20; H01M 50/531; H01M 50/572
See application file for complete search history.

(56) References Cited

U.S. PATENT DOCUMENTS

| 2009/0269620 | A1* | 10/2009 | Kim | H01M 2/06 429/7 |
| 2010/0053859 | A1* | 3/2010 | Chang | H01R 13/5213 361/679.01 |

FOREIGN PATENT DOCUMENTS

| CN | 204651372 U | 9/2015 |
| CN | 206727133 U | 12/2017 |

(Continued)

OTHER PUBLICATIONS

Contemporary Amperex Technology Co., Limited, Extended European Search Report, EP19187047.6, dated Jan. 3, 2020, 6 pgs.

*Primary Examiner* — Olatunji A Godo (74) *Attorney, Agent, or Firm* — Morgan, Lewis & Bockius LLP (57) ABSTRACT

The present disclosure provides a battery module and a protecting assembly thereof. The protecting assembly comprises a base and an upper cover. The base is fixed to an end plate, a receiving cavity is formed between the upper cover and the base. An outputting electrode piece extends into the receiving cavity. The base comprises a basic body and a first side plate, the first side plate extends from the basic body, the basic body are provided with first grooves. The upper cover comprises a top wall, a first side wall extending downwardly from the top wall, a second side wall extending downwardly from the top wall and a limiting wall extending downwardly from the second side wall and inclined. The limiting wall is inserted into the first groove, the first side wall latches with the first side plate.

18 Claims, 5 Drawing Sheets

(51) Int. Cl.
  *H01M 50/147* (2021.01)
  *H01M 50/531* (2021.01)
  *H01M 50/572* (2021.01)
(52) U.S. Cl.
  CPC ....... *H01M 50/531* (2021.01); *H01M 50/572* (2021.01); *H01M 2220/20* (2013.01)

(56) References Cited

FOREIGN PATENT DOCUMENTS

| | | |
|---|---|---|
| EP | 0765005 A2 | 3/1997 |
| WO | WO-9835395 A1 | 8/1998 |
| WO | WO-2006112628 A1 | 10/2006 |

\* cited by examiner

BATTERY MODULE AND PROTECTING ASSEMBLY THEREOF

CROSS-REFERENCE TO RELATED APPLICATIONS

The present application claims priority to Chinese patent application No. CN201821680852.X, filed on Oct. 17, 2018, which is incorporated herein by reference in its entirety.

FIELD OF THE PRESENT DISCLOSURE

The present disclosure relates to the field of battery, and particularly relates to a battery module and a protecting assembly thereof.

BACKGROUND OF THE PRESENT DISCLOSURE

Electric current of batteries of a battery module is generally output via an outputting electrode piece; in order to protect the outputting electrode piece, the battery module is generally provided with a protecting assembly, the protecting assembly can realize the fixation and the insulation of the outputting electrode piece. However, the protection level of the existing protecting assembly is relatively low, and the connecting strength between the members of the protecting assembly is lower, so when the battery module is subjected to vibration, the protecting assembly is prone to failure.

SUMMARY OF THE PRESENT DISCLOSURE

In view of the problem existing in the background, an object of the present disclosure is to provide a battery module and a protecting assembly thereof, which can simplifying the assembling process of the protecting assembly and promote the connecting strength between the members of the protecting assembly.

In order to achieve the above object, the present disclosure provides a battery module and a protecting assembly thereof.

The protecting assembly comprises a base and an upper cover. The base is capable of being fixed to an end plate of the battery module, the upper cover and the base is capable of being connected with each other to form a receiving cavity. An outputting electrode piece of the battery module is capable of being connected with a battery and extending into the receiving cavity. The base comprises a basic body and a first side plate, the first side plate extends upwardly from an end of the basic body in a transverse direction, two ends of the basic body in a longitudinal direction are provided with first grooves. The upper cover comprises a top wall, a first side wall, a second side wall and a limiting wall, the first side wall extends downwardly from an end of the top wall in the transverse direction, the second side wall extends downwardly from two ends of the top wall in the longitudinal direction respectively, the limiting wall extends downwardly from a lower end of the second side wall and is inclined toward a direction away from the first side wall. The limiting wall is capable of being inserted into the first groove, the first side wall is capable of latching with the first side plate.

The first side wall comprises a first portion, a second portion and a third portion, the first portion extends downwardly from the end of the top wall in the transverse direction, the second portion extends from a lower end of the first portion along a direction away from the limiting wall, the third portion extends upwardly from an end of the second portion away from the limiting wall.

An inner side of the first side plate in the transverse direction is provided with a second groove, a side of the third portion away from the first portion is provided with a latch, the latch is capable of being engaged with the second groove.

An end of the limiting wall away from the second side wall is arc in shape.

A first opening and a second opening are formed between the upper cover and the base. The outputting electrode piece is capable of extending into the receiving cavity via the first opening.

A third opening is further capable of being formed between the upper cover and the base, an orientation of the third opening and an orientation of the second opening are perpendicular with each other.

The upper cover is provided with ribs, and the ribs are provided in at least one of the second opening and the third opening.

The third opening is formed in the second side wall.

Two ends of the basic body in the transverse direction are provided with third grooves.

A battery module comprises a battery, an end plate, an outputting electrode piece and the protecting assembly. The battery is provided as plurality in number and the plurality of batteries are sequentially arranged in a longitudinal direction. The end plate is provided to two ends of the batteries in the longitudinal direction. The base of the protecting assembly is fixed with the end plate, the limiting wall of the upper cover is inserted into the first groove, the first side wall latches with the first side plate. The receiving cavity is formed between the upper cover and the base. The outputting electrode piece is connected with the battery and extends into the receiving cavity.

The present disclosure has the following beneficial effects: in the present disclosure, because the limiting wall is inclined relative to the transverse direction and the up-down direction, the limiting wall only needs to be slideably inserted into the first groove and cooperate with the first side wall to realize the connection of the base and the upper cover, therefore the assembling process is simple. In addition, the limiting wall is subjected to forces in various directions, so the connecting strength between the base and the upper cover is high, the base and the upper cover are not prone to be separated when the battery module is subjected to vibration, thereby avoid failure of the protective function of the protecting assembly.

Reference numerals in figures are represented as follows:

1 protecting assembly
  11 base
    111 basic body
    112 first side plate
    113 first groove
    114 second groove
    115 third groove
    116 second side plate
  12 upper cover
    121 top wall
    122 first side wall
      122A first portion
      122B second portion
      122C third portion
    123 second side wall
    124 limiting wall
    125 latch
    126 rib
    127 third side wall
  13 first opening
  14 second opening
  15 third opening
2 battery
3 end plate
4 outputting electrode piece
5 busbar
6 connecting plate
7 covering plate
8 connecting piece
X transverse direction
Y longitudinal direction
Z up-down direction

DETAILED DESCRIPTION

To make the object, technical solutions, and advantages of the present disclosure more apparent, the present disclosure will be further described in detail in combination with the accompanying figures and the embodiments. It should be understood that the specific embodiments described herein are merely used to explain the present disclosure but are not intended to limit the present disclosure.

In the description of the present disclosure, unless otherwise specifically defined and limited, the terms "first", "second" and "third" are only used for illustrative purposes and are not to be construed as expressing or implying a relative importance. The term "plurality" is two or more. Unless otherwise defined or described, the term "connect" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

In the description of the present disclosure, it should be understood that spatially relative terms, such as "above", "below" and the like, are described based on orientations illustrated in the figures, but are not intended to limit the embodiments of the present disclosure. Hereinafter the present invention will be further described in detail in combination with the exemplary embodiments and the figures.

FIGS. 1-5 are schematic views of a first embodiment of a battery module of the present disclosure.

Figure 1:
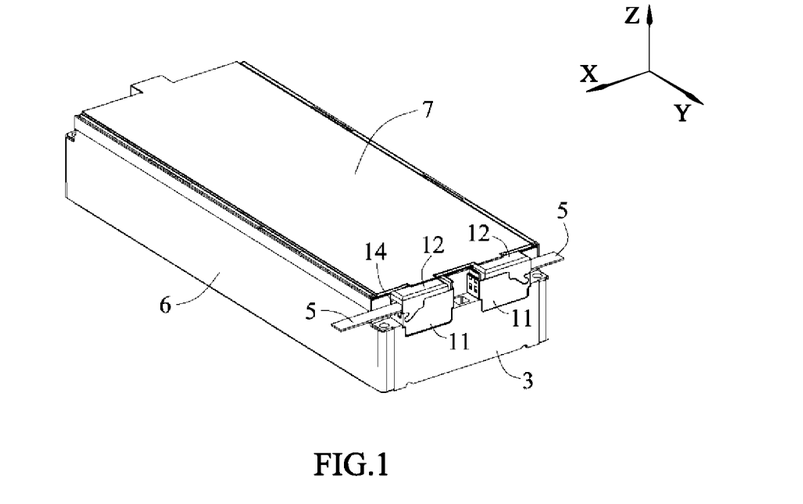
FIG. 1 is a schematic view of an embodiment of a battery module according to the present disclosure.
Figure 2:
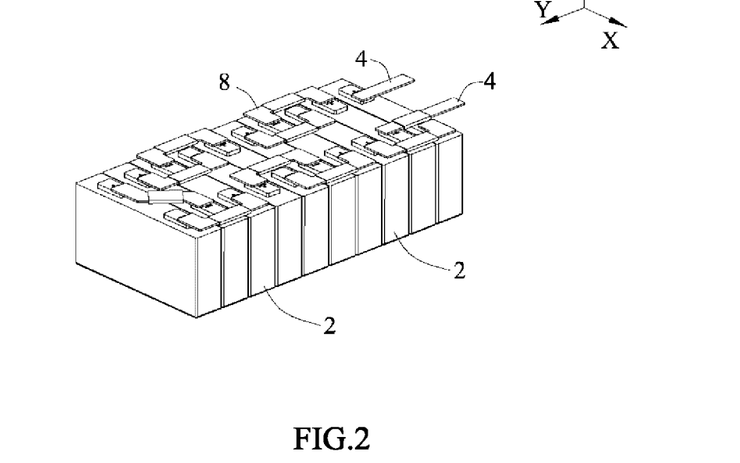
FIG. 2 is a schematic view of batteries of the battery module of FIG. 1.

Referring to FIG. 1 and FIG. 2, the battery module comprises a protecting assembly 1, a battery 2, an end plate 3, an outputting electrode piece 4, a connecting plate 6, a covering plate 7 and a connecting piece 8.

The battery 2 may be a prismatic lithium-ion battery, and have two electrode terminals protruded from the top thereof, that is a positive electrode terminal and a negative electrode terminal. The battery 2 is provided as plurality in number and the batteries 2 are sequentially arranged in a longitudinal direction Y. The end plate 3 is provided as two in number and the two end plates 3 are respectively provided to two ends of the batteries 2 in the longitudinal direction Y, the connecting plate 6 is provided as two in number and the two connecting plates 6 are respectively provided to two sides of the batteries 2 in a transverse direction X, the end plates 3 and the connecting plates 6 are fixed together to form a rectangular frame. The batteries 2 can be fixed with the frame by bonding and the like.

The connecting piece 8 is provided as plurality in number and connected with the electrode terminals of the batteries 2, the plurality of connecting pieces 8 connect the batteries 2 in series, in parallel or in series-parallel. The covering plate 7 is provided above the batteries 2 and the connecting pieces 8.

The outputting electrode piece 4 is provided as two in number, one outputting electrode piece 4 is connected with a positive electrode terminal as a total positive output electrode of the battery module, the other outputting electrode piece 4 is connected with a negative electrode terminal as a total negative output electrode of the battery module. The outputting electrode pieces 4 are used for realizing the current collection and the output of the batteries 2.

Figure 3:
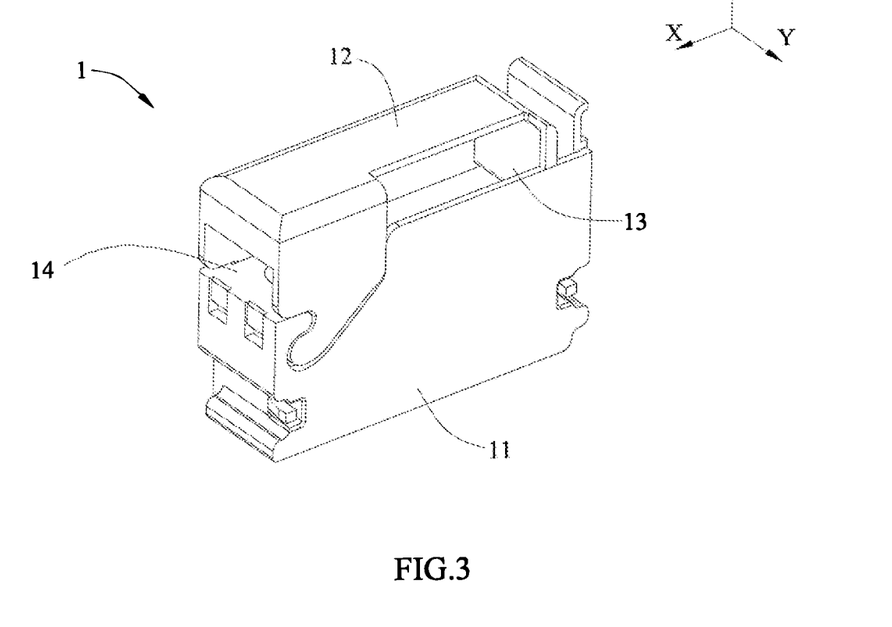
FIG. 3 is a schematic view of a protecting assembly of FIG. 1.
Figure 4:
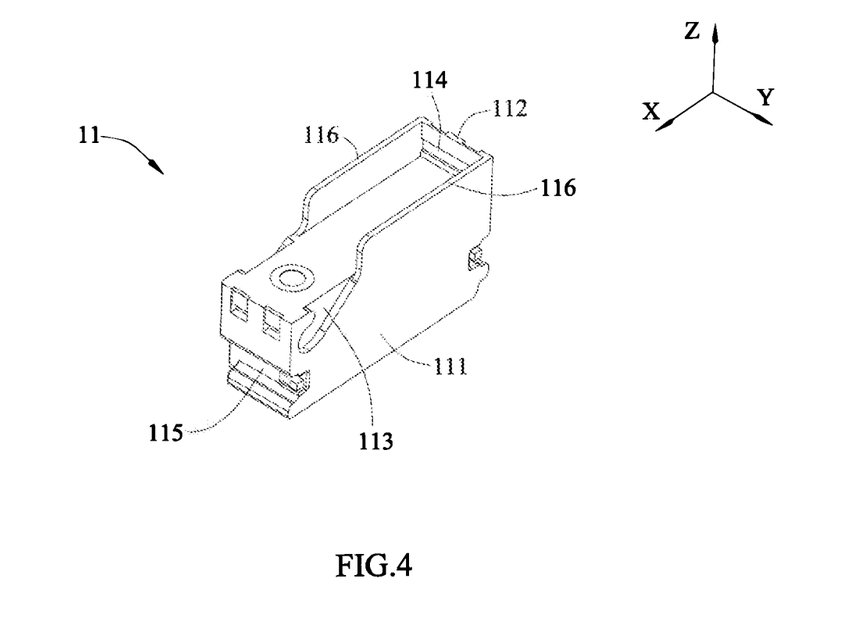
FIG. 4 is a schematic view of a base of the protecting assembly of FIG. 3.
Figure 5:
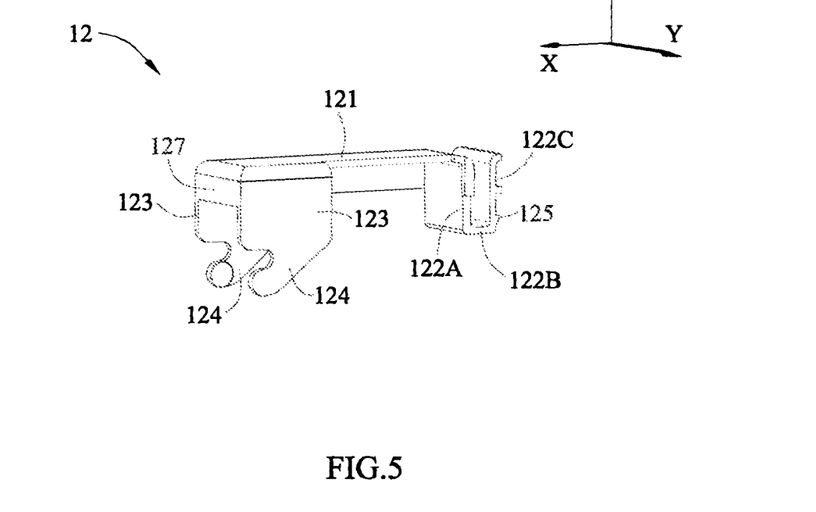
FIG. 5 is a schematic view of an upper cover of the protecting assembly of FIG. 3.

Referring to FIG. 3 to FIG. 5, the protecting assembly 1 comprises a base 11 and an upper cover 12, the base 11 may be fixed to the end plate 3 by a fastener, the upper cover 12 and the base 11 are connected with each other to form a receiving cavity; one end of the outputting electrode piece 4 is connected with the electrode terminal of the battery 2, the other end of the outputting electrode piece 4 extends into the receiving cavity. The base 11 and the upper cover 12 can cover the outputting electrode piece 4 from outside, so as to prevent the outputting electrode piece 4 contacting other electrical conductor, realize the insulation of the outputting electrode piece 4. At the same time, the protecting assembly 1 further increases a creepage distance and an electric clearance between the external electrical conductor (such as the end plate 3) and the outputting electrode piece 4, so as to satisfy the requirement of the battery module on ingress protection (IP) level.

The base 11 comprises a basic body 111 and a first side plate 112, the first side plate 112 extends upwardly from an end of the basic body 111 in the transverse direction X, two ends of the basic body 111 in the longitudinal direction Y are provided with first grooves 113. The upper cover 12 comprises a top wall 121, a first side wall 122, second side walls 123 and limiting walls 124, the first side wall 122 extends downwardly from an end of the top wall 121 in the transverse direction X, the second side walls 123 extend downwardly from two ends of the top wall 121 in the longitudinal direction Y respectively, the limiting wall 124 extends downwardly from a lower end of each second side wall 123 and is inclined toward a direction away from the first side wall 122. The limiting wall 124 is inserted into the first groove 113 and latches with the basic body 111, the first side wall 122 extends to an inner side of the first side plate 112 and latches with the first side plate 112.

Because the first side wall 122 is positioned at the inner side of the first side plate 112 in the transverse direction X, and the limiting wall 124 is inclined relative to an up-down direction Z toward the direction away from the first side wall 122, the first side plate 112 and the basic body 111 can limit the upper cover 12 in the transverse direction X. The two limiting walls 124 are respectively positioned at two side of the basic body 111 in the longitudinal direction Y, so the basic body 111 can limit movement of the upper cover 12 in the longitudinal direction Y. At the same time, the limiting wall 124 is inclined relative to the up-down direction Z, so the basic body 111 further can limit movement of the upper cover 12 in the up-down direction Z.

In the present disclosure, because the limiting wall 124 is inclined relative to the transverse direction X and the up-down direction Z, the limiting wall 124 only needs to be slideably inserted into the first groove 113 and cooperate with the first side wall 122 to realize the connection of the base 11 and the upper cover 12, therefore the assembling process is simple. In addition, the limiting wall 124 is subjected to forces in various directions, so the connecting strength between the base 11 and the upper cover 12 is high, the base 11 and the upper cover 12 are not prone to be separated when the battery module is subjected to vibration, thereby avoid failure of the protective function of the protecting assembly 1.

The first side wall 122 comprises a first portion 122A, a second portion 122B and a third portion 122C, the first portion 122A extends downwardly from the end of the top wall 121 in the transverse direction X, the second portion 122B extends from a lower end of the first portion 122A along a direction away from the limiting wall 124, the third portion 122C extends upwardly from an end of the second portion 122B away from the limiting wall 124. The first side wall 122 bends to be an elastically U-shaped structure, so when assembling the base 11 and the upper cover 12, the first side wall 122 can be deformed elastically, thereby lowering the assembling difficulty of the base 11 and the upper cover 12, and simplifying the assembling process.

An inner side of the first side plate 112 in the transverse direction X is provided with a second groove 114, a side of the third portion 122C away from the first portion 122A is provided with a latch 125, the latch 125 can be engaged with the second groove 114. When assembling the base 11 and the upper cover 12, the third portion 122C can deflect toward a direction away from the first side plate 112; when the latch 125 has been inserted into the second groove 114, the third portion 122C will be restored to original state.

An end of the limiting wall 124 away from the second side wall 123 is arc in shape. The end which is arc in shape helps decrease resistance when assembling, avoids the limiting wall 124 being seized in the process of being inserted into the first groove 113.

A first opening 13 and a second opening 14 are formed between the upper cover 12 and the base 11. The first opening 13 faces the battery 2, and the outputting electrode piece 4 extends into the receiving cavity via the first opening 13.

Two battery modules can be connected by a busbar 5.

For example, referring to FIG. 1, an end of the busbar 5 extends into the receiving cavity of one battery module via the second opening 14 of the one battery module and is connected with the outputting electrode piece 4 of the one battery module, the other end of the busbar 5 extends into the receiving cavity of the other battery module via the second opening 14 of the other battery module and is connected with the outputting electrode piece 4 of the other battery module. The busbar 5 connects the outputting electrode pieces 4 of the two battery modules, thereby realizing the current collection output of the two battery modules. The busbar 5 and the outputting electrode piece 4 can be fixed to the basic body 111 via a fastener.

The upper cover 12 further comprises a third side wall 127, the third side wall 127 and the first side wall 122 respectively extend from the two ends of the top wall 121 in the transverse direction X. The base 11 further comprises second side plates 116 extending upwardly from two ends of the basic body 111 in the longitudinal direction Y. Referring to FIG. 3 to FIG. 5, the second side wall 123 may be provided with a notch, the second side plate 116 can be inserted into the notch of the second side wall 123 and fitted with the second side wall 123.

The first opening 13 may be encircled by the top wall 121, the second side wall 123 and the second side plate 116, the second opening 14 may be encircled by the third side wall 127, the second side walls 123 and the basic body 111.

Referring to FIG. 4, two ends of the basic body 111 in the transverse direction X are provided with third grooves 115, each third groove 115 extends in the longitudinal direction Y. The end plate 3 may be provided with a strip, the strip is fitted with the third groove 115. When assembling the end plate 3 and the base 11, the strip of the end plate 3 may be slideably inserted into the third groove 115, and the strip can limit the movement of the basic body 111 in the up-down direction Z, thereby promoting the connecting strength of the end plate 3 and the basic body 111.

The base 11 and the upper cover 12 may be made from insulating plastic.

Hereinafter other embodiments of the present disclosure will be described. In order to make description concise, hereinafter the differences between the other embodiments and the first embodiment are mainly described, the part which is not described can be understood with reference to the first embodiment.

Figure 6:
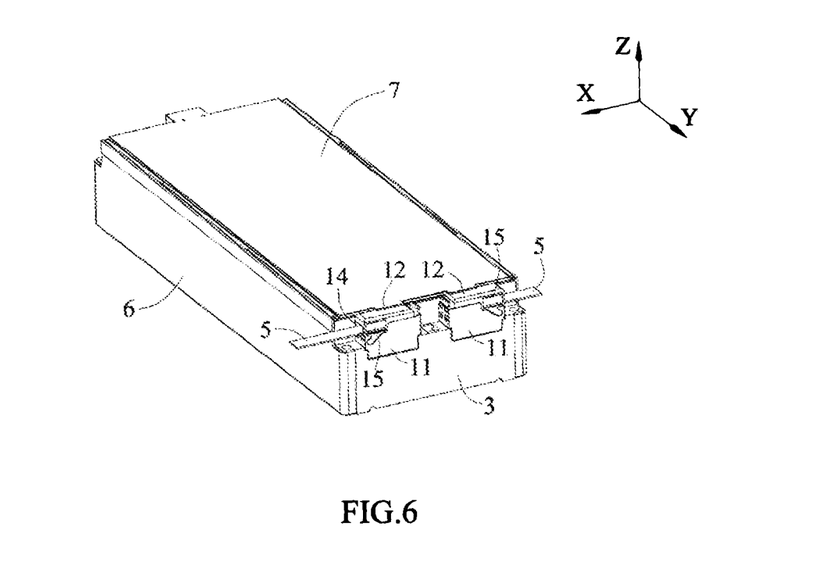
FIG. 6 is a schematic view of another embodiment of the battery module according to the present disclosure.

FIG. 6 is a schematic view of a second embodiment of the battery module of the present disclosure. In the second embodiment, a third opening 15 is further formed between the upper cover 12 and the base 11, an orientation of the third opening 15 and an orientation of the second opening 14 are perpendicular with each other. The second opening 14 may be formed at an end of the protecting assembly 1 in the transverse direction X, the third opening 15 may be formed to an end of the protecting assembly 1 in the longitudinal direction Y.

A battery pack of the electric vehicle generally comprises a plurality of battery modules, and the arranging directions of the plurality of battery modules are diversified. When two battery modules are arranged in the transverse direction X, two ends of the busbar 5 can respectively extend into the second openings 14 of the two battery modules; when two battery modules are arranged in the longitudinal direction Y, two ends of the busbar 5 can respectively extend into the third openings 15 of the two battery modules. That is, by providing the second opening 14 and the third opening 15 in the protecting assembly 1, the present disclosure can promote the connecting flexibility between the battery modules, simplify the structure of the busbar 5. In addition, if the protecting assembly 1 is not provided with the third opening 15, when two battery modules are arranged in the longitudinal direction Y, the busbar 5 further needs to be bent.

The third opening 15 is formed in one of the second side walls 123, the first opening 13 may be formed in the other of the second side walls 123.

Figure 7:
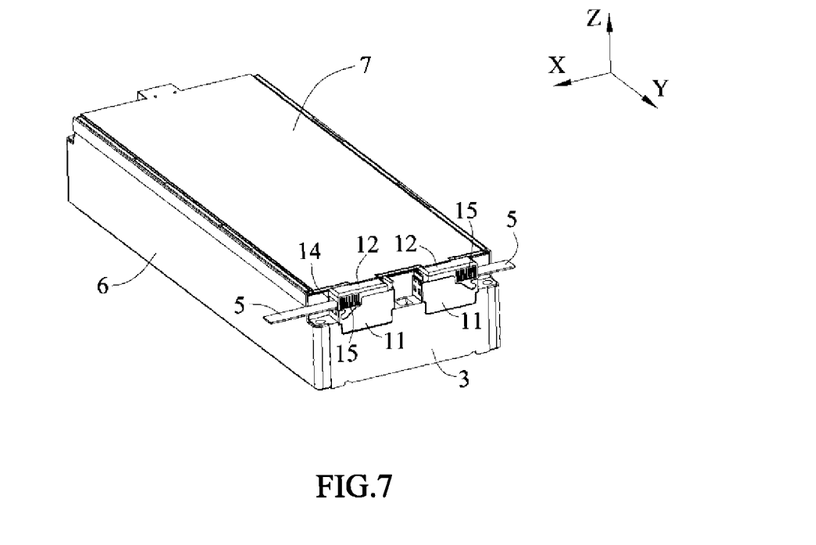
FIG. 7 is a schematic view of still another embodiment of the battery module according to the present disclosure.

FIG. 7 is a schematic view of a third embodiment of the battery module of the present disclosure. Compared to the second embodiment, the upper cover 12 of the third embodiment is provided with ribs 126, and the ribs 126 are positioned in the third opening 15. The busbar 5 may extend into the receiving cavity via the second opening 14 and is connected with the outputting electrode piece 4.

Figure 9:
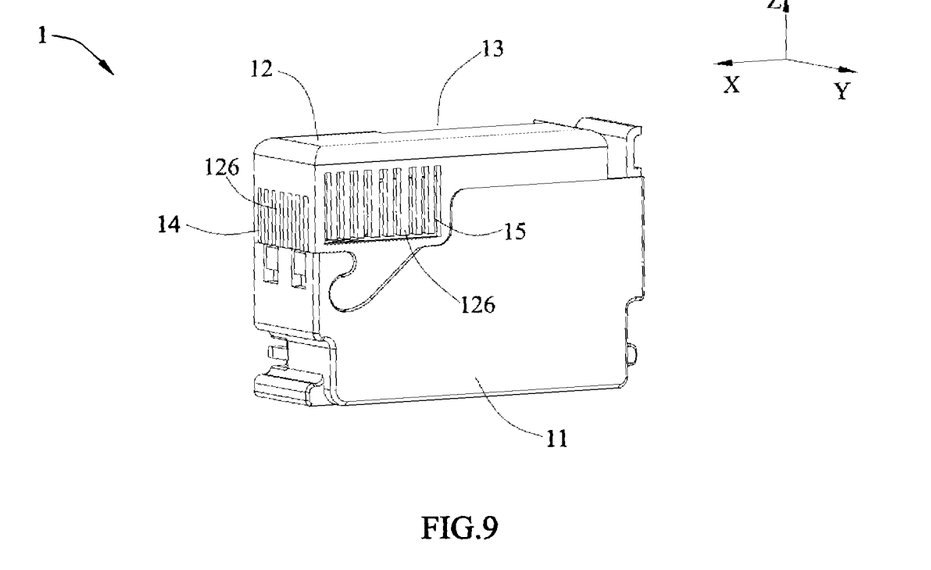
FIG. 9 is a schematic view of yet another embodiment of the protecting assembly according to the present disclosure.
Figure 10:
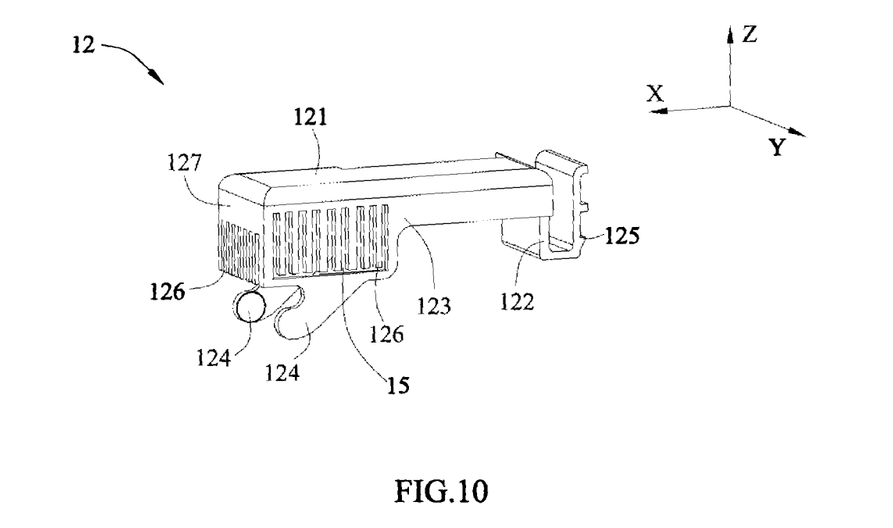
FIG. 10 is a schematic view of the upper cover of the protecting assembly of FIG. 9.

The protecting assembly 1 of the third embodiment can have a structure as shown in FIG. 9. The ribs 126 are provided in the second opening 14 and the third opening 15. The strength of the ribs 126 is small, so the ribs 126 can be easily removed from the upper cover 12.

When two battery modules are arranged in the transverse direction X, the busbar 5 needs to extend into the receiving cavity via the second opening 14; at this time, based on the protecting assembly 1 in FIG. 9, it only needs to remove the ribs 126 in the second opening 14.

Compared to the second embodiment, the ribs 126 of the third embodiment can promote the closed performance of the receiving cavity of the protecting assembly 1, and improve the insulating function and the protecting function of the protecting assembly 1.

Figure 8:
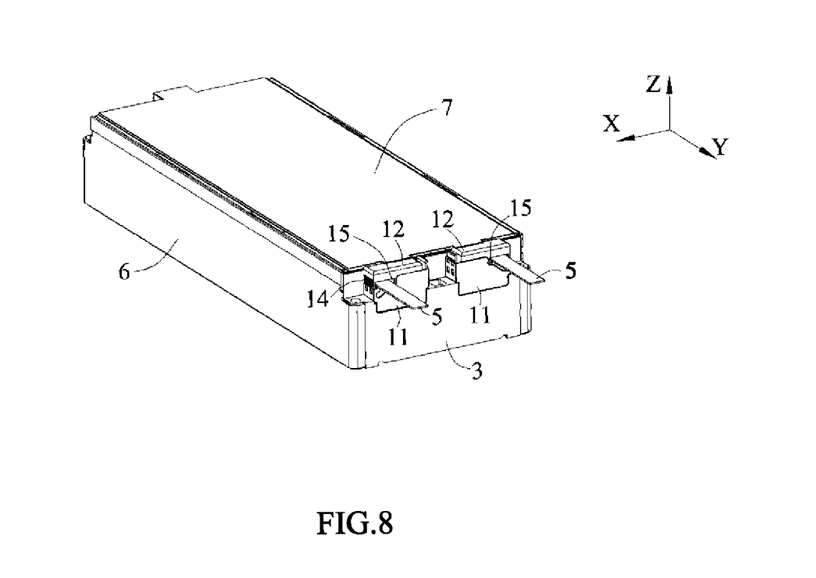
FIG. 8 is a schematic view of further another embodiment of the battery module according to the present disclosure.

FIG. 8 is a schematic view of a fourth embodiment of the battery module of the present disclosure. Compared to the second embodiment, the upper cover 12 of the fourth embodiment is provided with ribs 126, the ribs 126 are positioned in the second opening 14. The busbar 5 can extend into the receiving cavity via the third opening 15 and be connected with the outputting electrode piece 4.

The protecting assembly 1 of the fourth embodiment can have a structure as shown in FIG. 9. The ribs 126 are provided in the second opening 14 and the third opening 15. The strength of the ribs 126 is small, so the ribs 126 can be easily removed from the upper cover 12.

When two battery modules are arranged in the longitudinal direction Y, the busbar 5 needs to extend into the receiving cavity via the third opening 15; at this time, based on the protecting assembly 1 in FIG. 9, it only needs to remove the ribs 126 in the third opening 15.

Compared to the second embodiment, the ribs 126 of the fourth embodiment can promote the closed performance of the receiving cavity of the protecting assembly 1, and improve the insulating function and the protecting function of the protecting assembly 1.

What is claimed is:

1. A protecting assembly of a battery module,
the battery module comprising a plurality of batteries, two end plates and an outputting electrode piece, each battery having two electrode terminals, one electrode terminal of one corresponding battery of the plurality of batteries being acted as a total output electrode of the battery module, the plurality of batteries being sequentially arranged in a longitudinal direction, the two end plates being provided to two opposite ends of the plurality of batteries in the longitudinal direction, the outputting electrode piece of the battery module being connected to the total output electrode of the battery module,
the protecting assembly comprising a base and an upper cover;
the base being capable of being fixed to one of the two end plates of the battery module, the upper cover and the base being capable of being connected with each other to form a receiving cavity;
the outputting electrode piece of the battery module being capable of extending into the receiving cavity;
the base comprising a basic body and a first side plate, the first side plate extending upwardly from an end of the basic body in a transverse direction orthogonal to the longitudinal direction, each of two ends of the basic body in the longitudinal direction being provided with a first groove;
the upper cover comprising a top wall, a first side wall, two second side walls and two limiting walls arranged in the longitudinal direction, the first side wall extending downwardly from an end of the top wall in the transverse direction, the two second side walls extending downwardly from two ends of the top wall in the longitudinal direction respectively, each limiting wall extending downwardly from a lower end of a corresponding second side wall and being inclined toward a direction away from the first side wall; and
each limiting wall being capable of being inserted into a corresponding first groove of the basic body, the first side wall being capable of latching with the first side plate of the base.

2. The protecting assembly according to claim 1, wherein the first side wall comprises a first portion, a second portion and a third portion, the first portion extends downwardly from the end of the top wall in the transverse direction, the second portion extends from a lower end of the first portion along a direction away from the limiting wall, the third portion extends upwardly from an end of the second portion away from the limiting wall.

3. The protecting assembly according to claim 2, wherein an inner side of the first side plate in the transverse direction is provided with a second groove, a side of the third portion away from the first portion is provided with a latch, the latch is capable of being engaged with the second groove.

4. The protecting assembly according to claim 1, wherein an end of the limiting wall away from the second side wall is arc in shape.

5. The protecting assembly according to claim 1, wherein a first opening and a second opening are formed between the upper cover and the base;
the outputting electrode piece is capable of extending into the receiving cavity via the first opening.

6. The protecting assembly according to claim 5, wherein a third opening is further capable of being formed between the upper cover and the base, an orientation of the third opening and an orientation of the second opening are perpendicular with each other.

7. The protecting assembly according to claim 6, wherein the upper cover is provided with ribs, and the ribs are provided in at least one of the second opening and the third opening.

8. The protecting assembly according to claim 7, wherein the third opening is formed in the second side wall.

9. The protecting assembly according to claim 1, wherein two ends of the basic body in the transverse direction are provided with third grooves.

10. A battery module, comprising a plurality of batteries, two end plates, an outputting electrode piece and a protecting assembly;
each battery having two electrode terminals, one electrode terminal of one corresponding battery of the plurality of batteries being acted as a total output electrode of the battery module, the outputting electrode piece of the battery module being connected with the total output electrode of the battery module;

the plurality of batteries being sequentially arranged in a longitudinal direction;

the two end plates being provided to two opposite ends of the plurality of batteries in the longitudinal direction;

the protecting assembly comprising a base and an upper cover;

the base being fixed to one of the two end plates of the battery module, the upper cover and the base being connected with each other to form a receiving cavity;

the outputting electrode piece extending into the receiving cavity;

the base comprising a basic body and a first side plate, the first side plate extending upwardly from an end of the basic body in a transverse direction orthogonal to the longitudinal direction, each of two ends of the basic body in the longitudinal direction being provided with a first groove;

the upper cover comprising a top wall, a first side wall, two second side walls and two limiting walls arranged in the longitudinal direction, the first side wall extending downwardly from an end of the top wall in the transverse direction, the two second side walls extending downwardly from two ends of the top wall in the longitudinal direction respectively, each limiting wall extending downwardly from a lower end of a corresponding second side wall and being inclined toward a direction away from the first side wall; and each limiting wall being inserted into a corresponding first groove of the basic body, the first side wall latching with the first side plate of the base.

11. The battery module according to claim 10, wherein the first side wall comprises a first portion, a second portion and a third portion, the first portion extends downwardly from the end of the top wall in the transverse direction, the second portion extends from a lower end of the first portion along a direction away from the limiting wall, the third portion extends upwardly from an end of the second portion away from the limiting wall.

12. The battery module according to claim 11, wherein an inner side of the first side plate in the transverse direction is provided with a second groove, a side of the third portion away from the first portion is provided with a latch, the latch is engaged with the second groove.

13. The battery module according to claim 10, wherein an end of the limiting wall away from the second side wall is arc in shape.

14. The battery module according to claim 10, wherein a first opening and a second opening are formed between the upper cover and the base;

the outputting electrode piece extends into the receiving cavity via the first opening.

15. The battery module according to claim 14, wherein a third opening is further formed between the upper cover and the base, an orientation of the third opening and an orientation of the second opening are perpendicular with each other.

16. The battery module according to claim 15, wherein the upper cover is provided with ribs, and the ribs are provided in at least one of the second opening and the third opening.

17. The battery module according to claim 16, wherein the third opening is formed in the second side wall.

18. The battery module according to claim 1, wherein two ends of the basic body in the transverse direction are provided with third grooves.

\* \* \* \* \*